United States Patent
Fukasawa et al.

(10) Patent No.: US 7,676,594 B2
(45) Date of Patent: Mar. 9, 2010

(54) MIDDLEWARE PLATFORM

(75) Inventors: Kayoko Fukasawa, Yokohama (JP);
Anthony John Tarlano, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 966 days.

(21) Appl. No.: 10/527,700

(22) PCT Filed: Sep. 11, 2002

(86) PCT No.: PCT/EP02/10198

§ 371 (c)(1),
(2), (4) Date: Dec. 13, 2005

(87) PCT Pub. No.: WO2004/025982

PCT Pub. Date: Mar. 25, 2004

(65) Prior Publication Data

US 2006/0133307 A1    Jun. 22, 2006

(51) Int. Cl.
*G06F 15/173* (2006.01)
(52) U.S. Cl. .................. 709/238; 455/552.1; 455/436; 370/465
(58) Field of Classification Search ............ 455/552.1, 455/62, 452, 436; 370/352, 465; 709/218, 709/238
See application file for complete search history.

(56) References Cited

U.S. PATENT DOCUMENTS

| | | | |
|---|---|---|---|
| 7,099,687 B1 * | 8/2006 | Makela et al. ............ 455/552.1 |
| 7,466,719 B2 * | 12/2008 | Xu et al. .................... 370/465 |
| 2001/0055971 A1 | 12/2001 | Irwin et al. |
| 2002/0102983 A1 * | 8/2002 | Furuskar et al. ............ 455/452 |
| 2002/0143897 A1 * | 10/2002 | Patil .......................... 709/218 |
| 2003/0039237 A1 * | 2/2003 | Forslow .................... 370/352 |
| 2003/0095540 A1 * | 5/2003 | Mulligan et al. ............ 370/352 |
| 2004/0009751 A1 * | 1/2004 | Michaelis et al. ............ 455/62 |

FOREIGN PATENT DOCUMENTS

| | | |
|---|---|---|
| EP | 0 719 062 A2 | 6/1996 |
| EP | 1 039 697 A1 | 9/2000 |
| EP | 1 079 642 A1 | 2/2001 |
| WO | WO 99/16266 | 4/1999 |
| WO | WO 99/49690 | 9/1999 |

(Continued)

OTHER PUBLICATIONS

Ott, et al., "An architecture for adaptive QoS and its application to multimedia systems design," Computer Communications, 21:334-349 (1998).

(Continued)

*Primary Examiner*—Jungwon Chang
(74) *Attorney, Agent, or Firm*—Nutter McClennen & Fish LLP; John J. Penny, Jr.

(57) ABSTRACT

The present invention relates to the provision of a middleware platform apparatus and related method operating on top of the heterogeneous wireless network. In other words, there is provided at least one bearer service in a heterogeneous wireless network for at least one application running at a mobile endpoint roaming in the heterogeneous wireless network. It is proposed to dynamically adjust (S10, S12) the at least one bearer service provided through the heterogeneous wireless network (10) according to an operational context of a mobile endpoint (12).

23 Claims, 12 Drawing Sheets

FOREIGN PATENT DOCUMENTS

| | | |
|---|---|---|
| WO | WO 01/08434 A1 | 2/2001 |
| WO | WO 01/17291 A1 | 3/2001 |
| WO | WO 01/19129 A1 | 3/2001 |
| WO | WO 01/28160 A2 | 4/2001 |
| WO | WO 01/50790 A1 | 7/2001 |
| WO | WO 01/52501 A2 | 7/2001 |
| WO | WO 01/78328 A2 | 10/2001 |
| WO | WO 02/05581 A1 | 1/2002 |

OTHER PUBLICATIONS

Landfeldt, et al., "User Service Assistant: An End-to-End Reactive QoS Architecture," IEEE, pp. 177-186 (1998).

Le Bodic, et al., "Dynamic 3G Network Selection for Increasing the Competition in the Mobile Communications Market," pp. 1064-1071 (2000).

Brungger, et al., "Joining Forces in Solving Large-Scale Quadratic Assignment Problems in Parallel," IEEE, pp. 418-427 (1997).

Hou, et al., "Communication Middleware and Software for QoS Control in Distributed Real-Time Environments," IEEE, pp. 558-564 (1997).

International Search Report dated Jan. 20, 2003.

International Preliminary Examination Report dated Feb. 8, 2005.

* cited by examiner

| Bearer Configuration Table | | | | | | |
|---|---|---|---|---|---|---|
| WLAN | GSM-A | GSM-B | GSM-C | GPRS-A | GPRS-B | ... |
| Available | Not Available | Available | Not Available | Not Available | Available | ... |
| ... | ... | ... | ... | ... | ... | ... |

Fig. 9

| | | User Preference | | |
|---|---|---|---|---|
| Priority | Application | 1 | 2 | 3 |
| 3 | Mail | GPRS-A | WLAN | GSM-B |
| 2 | HTTP | WLAN | GPRS-A | GSM-A |
| 1 | Voice | GSM-A | GSM-B | GPRS-A |
| 4 | FTP | WLAN | GPRS-A | GPRS-B |
| ... | ... | ... | ... | ... |

Fig. 10

| Bearer Configuration Table | | | | | | | |
|---|---|---|---|---|---|---|---|
| WLAN | GSM-A | GSM-B | GSM-C | GPRS-A | GPRS-B | ... | |
| Available | Not Available | Available | Not Available | Not Available | Available | ... | T1 |
| Available | Available | Available | Not Available | Available | Not Available | ... | T2 |
| ... | ... | ... | ... | ... | ... | ... | |

Assignment Result Time T1

| Priority | Application | User Preference | | |
|---|---|---|---|---|
| | | 1 | 2 | 3 |
| 3 | Mail | GPRS-A | WLAN | GSM-B |
| 2 | HTTP | WLAN | GPRS-A | GSM-A |
| 1 | Voice | GSM-A | GSM-B | GPRS-A |
| 4 | FTP | WLAN | GPRS-A | GPRS-B |
| ... | ... | ... | ... | ... |

Assignment Result Time T2

| Priority | Application | User Preference | | |
|---|---|---|---|---|
| | | 1 | 2 | 3 |
| 3 | Mail | GPRS-A | WLAN | GSM-B |
| 2 | HTTP | WLAN | GPRS-A | GSM-A |
| 1 | Voice | GSM-A | GSM-B | GPRS-A |
| 4 | FTP | WLAN | GPRS-A | GPRS-B |
| ... | ... | ... | ... | ... |

Fig. 11

| Bearer Configuration Table | | | | | | |
|---|---|---|---|---|---|---|
| Bearer Capability | | | | | | Bearer Availability |
| Type | Bandwidth | Latency | BER | Reliability | Cost | |
| GSM-A | 9.6k | 2 sec | 10-6 | High | Low | Available |
| GPRS | 24.4k | 1 sec | 10-7 | Medium | Low | Available |
| WLAN | 2M | 0.5 sec | 10-5 | Low | Free | Available |
| GSM-B | 9.6k | 100 msec | 10-6 | High | Low | Available |
| : | : | : | : | : | : | : |

Fig. 12

| Priority | Application | User Preference | | |
|---|---|---|---|---|
| | | Bandwidth/ Content | Latency | Realtime |
| 3 | Mail | 9.6k-2M | 2 sec | Low |
| 2 | HTTP | Up to 2M | 1sec | Medium |
| 1 | Voice | 9.6k | 100 msec | High |
| 4 | VoIP | ... | ... | High |
| ... | ... | ... | ... | ... |

Fig. 13

|  | GSM-A | GSM-B | GPRS | WLAN |
|---|---|---|---|---|
| Voice | ∞ (Latency) | 0 | ∞ (Latency) | ∞ (Latency) |
| Http | ∞ (Bandwidth) | ∞ (Bandwidth) | ∞ (Bandwidth) | 0 |
| Mail | 0 | 0 | >0 (Waste of Bandwidth) | > GPRS (Waste of Bandwidth) |
| VoIP | ∞ (Type of application) | ∞ (Type of Application) | >0 | > GPRS (Waste of Bandwidth) |

Fig. 16

MIDDLEWARE PLATFORM

FIELD OF INVENTION

The present invention relates to the provision of a middleware platform apparatus and related method, in particular to the provision of middleware platform apparatus and related method operating on top of a heterogeneous wireless network.

BACKGROUND ART

In Ott M. et al.: 'An architecture for adaptive QoS and its application to multimedia systems design', Computer Communications, Elsevier Science Publishers BV, Amsterdam, NL, Vol. 21, No. 4, 10 Apr. 1998, pages 334-349, there is described an architecture for adaptive QoS and its application to multimedia system design, wherein the concept of QoS is applied to all layers of a software architecture. Each layer deals with QoS at its appropriate level of abstraction using a generic application interface for communicating QoS parameters.

Further, in Landfeldt B. et al.: 'User Service Assistant: an end-to-end reactive QoS architecture', Quality of Service, 1998(IWQOS 98), 1998 Sixth International Workshop on NAPA, Calif., USA, 18-20 May 1998, New York, N.Y., USA, IEEE, U.S. 18 May 1998, pages 177-186, there is described a framework for QoS management which is reactive and has a non-layered structure. The concept outlined focuses on providing assistance in decision making to a user, rather than automating the entire process of resource reservation and renegotiation.

Further, in US 2001/0055971 A1, there is described a method for radio access bearer reconfiguration in a communication system having a core network and user equipment coupled to a radio network controller. When the core network establishes a service with the user equipment, a radio access bearer is set up for that service including certain parameters that effect the quality of service. The radio network controller may then determine that one or more of the radio access bearer parameters need to be modified.

Further, in Le Bodic G. et al. 'Dynamic 3G network selection for increasing the competition in the mobile communications market', Vehicular Technology Conference, there is described a dynamic 3G network selection for increasing the competition in a mobile communications market, where a service provider, a network operator and a user have ability to trade communication services. For this purpose, there is specified a middleware in which software agents can supply or purchase QoS contracts.

Numerous factors associated with technology, business, regulation and social behavior have driven the spreading of mobile multimedia applications in the past, i.e. mobile applications that can deal with voice, image, text data, etc. Existing solutions to mobile multimedia applications rely on a single connection such as a TCT/IP connection and therefore focus on an integrated bearer service enabling the transfer of multimedia data over only a single TCT/IP connection.

The particular deficiency of this approach is that different multimedia data have different attributes, i.e. voice data may be characterized as real time data requiring a low band width, while image data may be transferred in a non-real time mode, however, involving an increased amount of data. Therefore, this approach is inherently inflexible in view of different characteristics of different multimedia services.

Another problem is non-compliance with future network architectures where an endpoint—i.e. a mobile device like a mobile telephone, personal digital agent PDA, or laptop computer—has the option to use parallel or equivalently multiple connections in a heterogeneous wireless network for supporting different applications running simultaneously at the mobile endpoint.

SUMMARY OF INVENTION

In view of the above, the object of the present invention is to provide a mechanism allowing for a flexible mapping of active applications to available bearer capabilities in a heterogeneous wireless network.

According to the present invention this object is achieved through a method of providing at least one bearer service in a heterogeneous wireless network for at least one application running at a mobile endpoint roaming in the heterogeneous wireless network having the features of claim 1.

Further the object is achieved through an apparatus for establishing a middleware platform on top of a heterogeneous wireless network in support of at least one application running at a mobile endpoint having the features of claim 13.

Therefore, the present invention allows to introduce parallelism into the support of multimedia applications running at a mobile endpoint. In more detail, parallelism means that multimedia applications running at a mobile endpoint—e.g., a mobile telephone, a PDA, a laptop computer etc.—must not rely on a single dedicated bearer service, but may use a plurality of such bearer services either alternatively or at the same point in time.

Another important advantage of the present invention is that the dynamic adjustment—i.e., detection of bearer capability in combination with a set up/tear down of bearer services according to application requirements—of the at least one bearer service is achieved considering an operational context of the mobile endpoint. This allows to have an optimized adjustment to operative conditions around the mobile endpoint and therefore a context sensitive optimization of a parallel bearer provision in a heterogeneous wireless network.

Overall, the present invention overcomes a previously established paradigm of using a dedicated bearer only in support of multimedia applications running at a mobile endpoint.

Further, according to the present invention dynamic adjustment is not only achieved in view of available bearer capabilities, but also in view of application requirements and capabilities of the mobile endpoint hardware, so as to achieve an overall optimized wireless communication.

Heretofore, it is proposed to detect available bearer capabilities and to manage bearer services as a function of available bearer capabilities and the operational context as outlined above. Preferably, the step of detection of available bearer capabilities and management of bearer services as a function of available bearer capabilities is integrated into a middleware platform provided between an application layer and lower layers of the protocol stack for optimized interoperability of the application layer and the lower layers in the protocol stack.

This platform-oriented approach to a multimedia application support on top of a heterogeneous wireless network relying on a bearer capability detection unit and a bearer service management unit is of particular advantage when considering flexibility of the overall system architecture. The bearer detection and the bearer management step and related units may either be assigned to the mobile endpoint, an endpoint server provided in the heterogeneous wireless communication network, a gateway server provided between the mobile endpoint and the application server provided in the wireless heterogeneous network. This allows to support a distributed middleware platform system architecture.

According to a further preferred embodiment of the present invention the step of detecting available bearer capabilities comprise the steps of negotiating bearer capabilities and, subsequent hereto, updating bearer capabilities in a bearer configuration memory.

Here, negotiation of bearer capabilities may be related to any data exchange between the lower physical layers in the protocol stack and the newly provided middleware platform.

A first option to negotiate bearer capabilities is the evaluation of signaling messages which are exchanged anyway, to detect capabilities of available bearer services.

Another option would be to analyze bearer services through the middleware platform to determine on the frequency use, number of time slots on the radio link, type of radio channels used, etc.

Further, the maintenance of bearer capabilities in a bearer configuration memory has the advantage of decoupling the negotiation of bearer capabilities from the evaluation of the generated information for handling of multimedia application communication requests.

According to another preferred embodiment of the present invention, the update of bearer capabilities in the bearer capability memories is executed either event driven or at predetermined points in time.

Here, event driven update of bearer capability means that such information is only modified when related bearer services actually change. To the contrary, the update of bearer capabilities at predetermined points in time allows to decrease the overall complexity of bearer capability detection.

While so far different aspects of bearer capability detection have been described, further preferred embodiments of the present invention relate to the registration of active multimedia applications running at the mobile endpoint.

According to a preferred embodiment of the present invention the registration of multimedia application relates at least to the registration of type of multimedia application, e.g., speech, audio, video, text. The step of registration may also comprise the registration of application requirements like application configuration and/or application priority. Preferably, application configuration relates to a group comprising quality of service QoS of application, band width of application, latency of application, real time requirements of application, cost boundaries, etc.

Therefore, according to the present invention and depending on the amount of information available, both, for the bearer capabilities and the type, configuration and requirements of multimedia application(s) running at the mobile endpoint, it is possible to optimize the assignment of the application requirements to the bearer capabilities.

Here, generally assignment means any type of assignment of a single application to a single bearer available on the lower layers of the protocol stack.

According to a preferred embodiment this step of managing bearer services is achieved by negotiating at least one communication request existing for an active application against a communication bearer capability of the heterogeneous wireless network and further by updating at least one assignment of an active application to available bearer service having the related bearer capability in accordance with the negotiation result.

These two steps of negotiation and update of assignment allow to provide a multimedia bearer support middleware platform on top of a heterogeneous wireless network enabling the handling of multiple bearer services—and therefore of related links or connections—for adjustment to a context around a mobile endpoint.

The overall outcome is a dynamic binding of mobile multimedia applications to, e.g., layer L3 and layer L4 connections in accordance with bearer capabilities up to layer L2 and in accordance with the context around the mobile endpoint. In other words, the steps of negotiating bearer capabilities against application requirements and update of a related assignment allow for assignment of available communication ports on lower layers up to layer L2 to activated applications.

Here, it should be noted that this general aspect of negotiation of bearer capability and update of assignment is not restricted to any particular type of assignment mechanism that may be used within the inventive middleware platform. To the contrary, any type of such assignment procedure which may be adapted according to the type of heterogeneous wireless network, available computation time within the middleware platform, requested degree of sophistication for assignment, etc. may be well installed within the inventive middleware platform. One may also consider to use a plurality of such assignment mechanism, e.g., according to the operational context of the mobile endpoint, detected bearer capabilities, or type of applications running at the mobile endpoint. One such example would be to run a more sophisticated assignment procedure when the number of multimedia applications and detected bearer services is high—in view of the achievable optimized assignment between the application layer and the bearer layer—and to use simplified assignment procedure in further cases—e.g., when the number of active applications and detected bearer services is low, so as to decrease complexity and therefore time-consumed within the middleware platform.

According to a preferred embodiment of the present invention, the step of negotiating comprises a step of generating a list of active applications, preferably in order of priority, and further a list of available bearer capabilities in the heterogeneous wireless network.

According to another preferred embodiment the step of negotiating further comprises the steps of assigning the next active application according to the order of priority to an available bearer service according to at least one predetermined rule and updating the remaining available bearer services/capabilities and the related list of non-assigned active applications.

This preferred embodiment of negotiating the active applications and related communication requirements against available bearer capabilities allows for a high efficiency and flexibility. The reason for efficiency is that the generation of lists, preferably according to an order of priority, allows to consider the more important applications first and only then to consider the less important active applications. Therefore, the most important active applications will be mapped to available bearer services first to avoid blockage of bearer capability provision for those active applications with higher priority.

Further, the general scheme outlined above allows to flexibly modify the rules used for the assignment of active applications onto available bearer services, e.g., rules like minimization of waste of band width, minimization of latency, minimization of communication costs, consideration of application contents, etc.

According to a further preferred embodiment of the present invention the assignment of active application to available bearer services is achieved considering a plurality of active applications in the plurality of available bearers and related assignment criteria at the same time. This allows to achieve an overall optimized assignment from the application domain onto the bearer domain through the inventive middleware platform.

In more details, it is proposed to evaluate a cost function for assignment of each active application to each available bearer capability.

Preferably, the cost function allows to evaluate at least one hard assignment condition for each such assignment, i.e. an assignment condition which must be fulfilled. Typical examples for hard assignment conditions are requirements for bandwidth of an active application.

Here, one might consider a situation where an available bearer is not suitable for an application as the related available bandwidth is too low to support a specific application. In such a case, it is not possible to assign the related active application to the available bearer. Further example for hard assignment conditions are an upper bound on latency, quality of service QoS of application, etc.

Also preferably, the cost function may allow to evaluate at least one soft assignment condition, i.e. an assignment condition which should be fulfilled.

Examples for such soft assignment conditions could be upper bounds on costs accepted for provision of specific band width, Qos, etc., further criteria-like reliability of a bearer service, end user preferences on type of bearers or operators providing a specific bearer, etc.

According to another preferred embodiment it is proposed to arrange costs for assignment of the different active applications to available bearers into a cost matrix for subsequent assignment of the active applications to the available bearer services. Also preferably—when a number of active applications exceeds in the number of available bearer services—those active applications having the lowest priorities assigned by the end user will be set inactive, so that finally the number of remaining active applications equals the number of available bearer services.

In view of the determined cost matrix, also referred to as selection table in the following, it will then be possible to determine an optimal assignment of active applications to available bearer services through application of appropriate optimization methods. One example is the use of linear assignment algorithms allowing to determine an optimal assignment of the active applications to the available bearer services considering an overall, global picture of related cost values.

According to a further preferred embodiment of the present invention, the step of negotiating an updating the assignment between active applications and available bearer services is repeated while the related applications are active.

This preferred embodiment of the present invention allows to improve dynamic matching of application requirements and capabilities of the heterogeneous wireless network, or in other words, to improve context sensitivity.

According to a further preferred embodiment of the present invention, the step of managing bearer services further comprises the step of setting up/tearing down bearer services in the heterogeneous wireless network according to changes of active applications and bearer services and related bearer capabilities.

Also this embodiment is of particular value to improve context sensitivity. It also supports modification of an assignment of an active application also during processing of the application.

Overall, the preferred embodiment of the present invention which evaluates a cost function for assignment of active applications to available bearer services is particularly well suited for consideration of user preference of configuration on applications, i.e. priorization of applications through user, further an application based configuration reflecting QoS requirements for active applications, content-based configurations—, e.g., measurement of length of total data with respect to a specific active application and assignment of the appropriate bearer service for the amount of data to be transferred.

Still further, the introduction of a cost function allows to evaluate information which remains unchanged over time as well as dynamically updated information to handle valuable parameters indicating the current status of lower link bearer connections. Yet another option is to consider user preferences on the wireless networks, i.e. parameters reflecting individual end user inclinations.

According to another preferred embodiment of the present invention there is provided a computer program product directly loadable into the internal memory of a mobile communication middleware platform comprising software code portions for performing the inventive middleware management process when the product is run on a processor of the mobile communication middleware platform.

Therefore, the present invention is also provided to achieve an implementation of the inventive method steps on computer or processor systems. In conclusion, such implementation leads to the provision of computer program products for use with a computer system or more specifically a processor comprised in e.g., a mobile communication middleware platform.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or Internet and/or telephone networks via modems or other interface devices. It should be understood that such media, when carrying processor readable instructions implementing the inventive concept represent alternate embodiments of the present invention.

BRIEF DESCRITPTION OF DRAWING

In the following the best mode of carrying out the present invention as well as preferred embodiments will be described with reference to the enclosed drawing in which:

FIG. 9 shows a first example for a bearer configuration table according to the present invention;

FIG. 10 shows a first example for a selection table as basis to assign active applications to available bearer services according to the present invention;

FIG. 11 shows the application of the bearer configuration table shown in FIG. 9 and the selection table shown in FIG. 10 to the determination of an assignment between active applications and available bearer services;

FIG. 12 shows a second example for a bearer configuration table according to the present invention;

FIG. 13 shows a second example of a selection table according to the present invention, also referred to as application configuration table;

FIG. 16 shows an example of a cost matrix derived on the basis of the bearer configuration table shown in FIG. 13 and the application configuration table shown in FIG. 14.

DESCRIPTION OF BEST MODE AND PREFERRED EMBODIMENTS

In the following, the best mode of carrying out the present invention and preferred embodiments thereof will be explained with reference to the drawings.

Throughout the following specification the term heterogeneous wireless network will refer to a mobile communication environment where at least one, preferably several wireless communication networks are operated for connecting a mobile endpoint to an application endpoint residing in the mobile communication environment. Typical examples for wireless communication networks are Wireless LAN, e.g., according to IEEE 802.11, Hyper LAN, mobile communication using WCDMA, e.g., according to NMT 2000.

Besides these packet-switched mobile communication networks, further examples relate to circuit-switched mobile communication, e.g., under the GSM, the PDC, the IS 45, the DAMPS, standard.

Further examples of wireless communication which may be applied to the present invention are infrared wireless communication, e.g., according to IrDA or the Bluetooth wireless communication standard.

Further, the best mode for carrying out the present invention and the different preferred embodiments thereof as explained in the following are particular well suited to and endpoint to endpoint communication scenario. Here, a first endpoint is a mobile endpoint, e.g., a mobile telephone, a mobile PDA, a mobile laptop computer, or any hybrid thereof. Further, the second endpoint resides in the mobile communication environment and may be an application server, a gateway server, etc.

As will be explained in more detail in the following, according to the present invention there is provided a middleware platform apparatus and related method that allow to achieve optimized connectivity over a heterogeneous or hybrid wireless communication network between such endpoints.

Contrary to existing wireless communication solutions, e.g. cellular mobile communication network allowing for one type of communication only within each cell, the middleware platform according to the present invention allows to introduce parallelism into the setup of communication channels for optimized exchange, both, of circuit-switched and packet-switched data between the mobile endpoint and the endpoint residing in the mobile communication environment.

Figure 1:
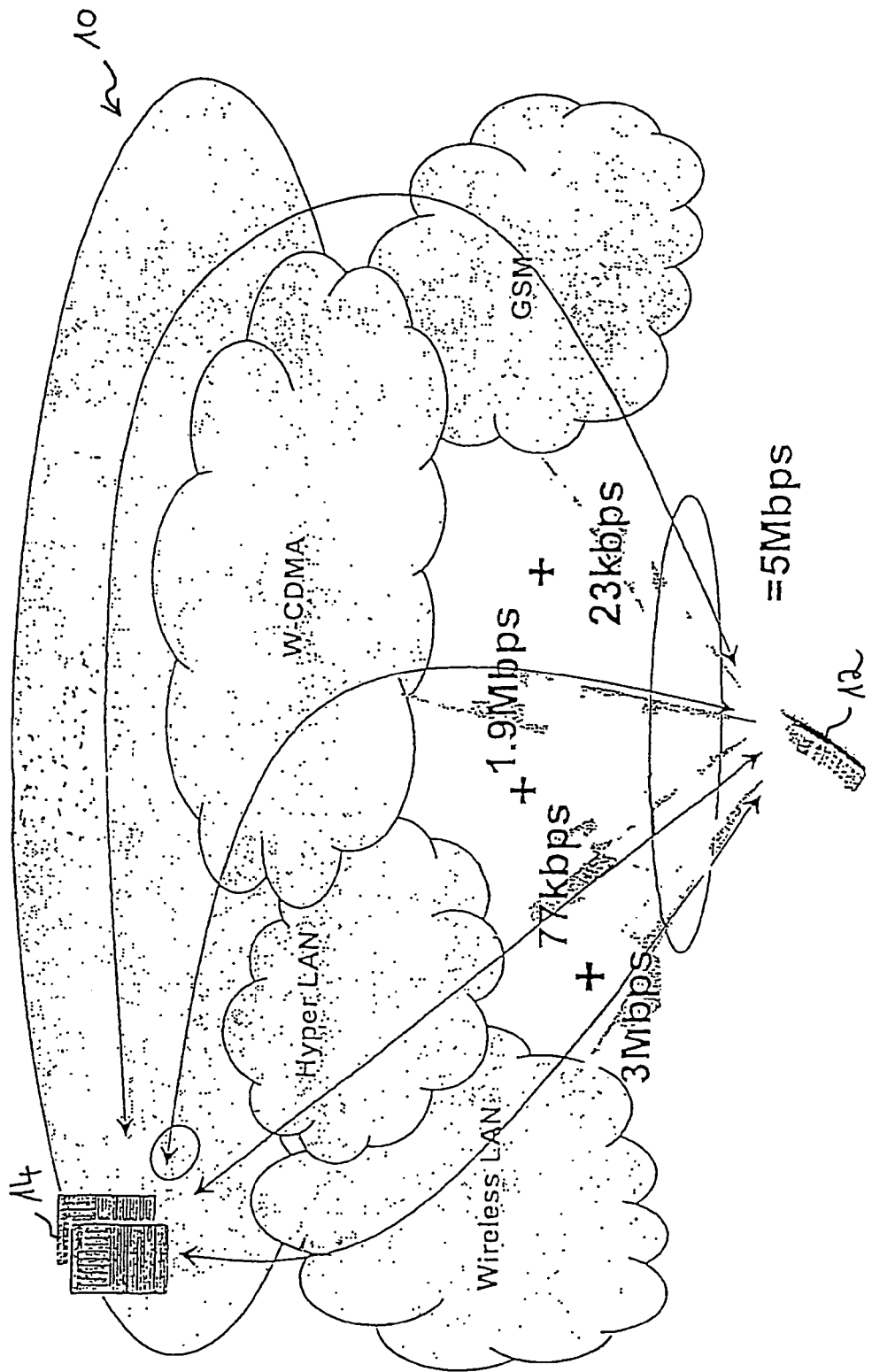
FIG. 1 shows a schematic diagram of a heterogeneous wireless network and an endpoint to endpoint communication using multiple bearer services according to the present invention.

FIG. 1 shows a schematic diagram of a heterogeneous wireless network 10 and related communication channels between a mobile endpoint 12 and a service endpoint 14. It should be noted, that although FIG. 1 shows the service endpoint 14 as part of the heterogeneous wireless communication network 10, nevertheless the service endpoint 14 may also reside in a network which may be accessed by the heterogeneous wireless network, e.g., the Internet.

As shown in FIG. 1, the heterogeneous wireless network 10 provides a plurality of different types for wireless communication between the mobile communication endpoint 12 and the service endpoint 14, e.g. a Wireless LAN network, a Hyper LAN, a WCDMA-based wireless communication network and a GSM-type wireless communication network. While the former four wireless networks are packet-switched wireless networks, the latter GSM wireless network is a circuit-switched wireless network.

From this, it should be concluded that the term heterogeneous wireless network in the sense of the present invention is not only related to different wireless communication networks as such, but also to different categories of wireless communication, such as packet-switched wireless communication and circuit-switched wireless communication.

As also shown in FIG. 1, according to the present invention it is proposed to combine heterogeneous wireless communication bearer services for support of active applications—e.g., multimedia applications divided into voice, data, image, etc.—running at the mobile endpoint 12.

For the example shown in FIG. 1, there may be achieved a total bandwidth of 5 Mbps through combination of the Wireless LAN network providing 3 Mbps, the Hyper LAN providing 77 kbps, WCDMA providing 1.9 Mbps and GSM providing 23 kbps of bandwidth.

Although not shown in FIG. 1, it is to be understood that the surrounding of the mobile endpoint is changeable when the end user of the mobile endpoint 12 is roaming during processing of the multimedia application running at the mobile endpoint 12. The change of the surrounding may also be due to change of available mobile communication networks while the position of the mobile endpoint 12 remains unchanged. Another reason for change of operative conditions may be the start or the termination of applications such as multimedia applications running at the mobile endpoint.

A typical scenario would be that an end user of the mobile endpoint 12 starts a multimedia application, e.g. for voice and video in a first area where he may not reserve the QoS and bandwidth which are required for the multimedia application. Then, when roaming to another place the required bandwidth and high QoS may become available due to additional wireless communication networks. Assuming that the end user of the mobile endpoint roams into a further area again with restricted communication capabilities, there may be required a re-adjustment of the bandwidth and a shut down of some bearer service.

Figure 2:
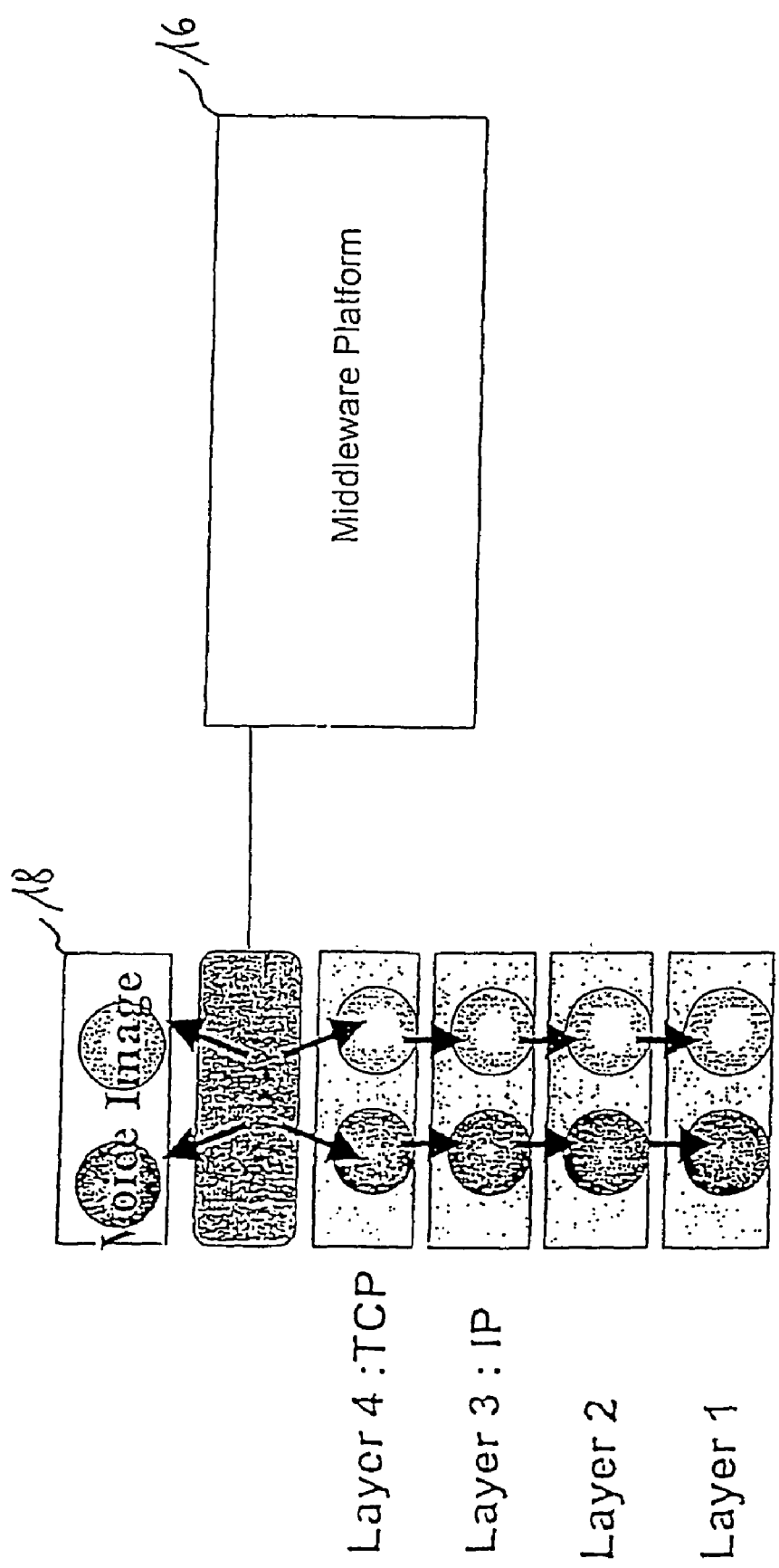
FIG. 2 shows a schematic diagram illustrating the integration of the middleware platform according to the present invention between the application layer and lower layers of the protocol stack of the heterogeneous wireless communication network.

FIG. 2 shows a schematic diagram illustrating the integration of a middleware platform 16 achieving the functionality explained with respect to FIG. 1.

As shown in FIG. 2, the middleware platform 16 is provided between an application layer 18 and lower layers L4 to L1 of a protocol stack established for wireless communication.

As also shown in FIG. 2, the middleware platform 16 according to the present invention establishes a platform on top of a protocol stack established of heterogeneous wireless network 10 to support at least one application—e.g., voice and/or image, etc.—at the mobile endpoint.

Operatively, the middleware platform 16 is adapted to dynamically adjust at least one bearer service provided to the heterogeneous wireless network 10 according an operational context of the mobile endpoint 12. Here, the operational context of the mobile endpoint 12 is related to the context of applications running at the mobile endpoint, the context of bearer capabilities in the heterogeneous wireless network, and further the context of the mobile endpoint 12 itself, e.g., the position of the mobile endpoint, the hardware being available at the mobile endpoint, the energy being available for communication at the mobile endpoint, etc.

Further, operatively, the middleware platform 16 allows to handle multimedia applications running at the mobile endpoint 12 having different attributes, e.g. voice data being transferred in real time with a small amount of data, and image data being transferred in non-real time, however, with a significantly increased amount of data.

Depending on characteristics of transferred data, the application(s) running at the mobile endpoint 12 and the wireless communication network(s) being available, the middleware platform 16 selects appropriate protocols and sets up/tears down at least one related wireless connection. The use of a plurality of wireless connections over heterogeneous wireless communication networks allows for a parallelism of communication and therefore for a significant improvement of communication flexibility and capabilities.

As shown also in FIG. 2, the middleware platform 16 may be located under the application layer over a TCP/UCP layer to enable control and adjustment of transmission bandwidth in response to multimedia application requests in view of available communication resources at each point in time. The middleware platform 16 will then enable the selection of the appropriate lower layer protocol(s) in accordance with characteristics of transferred data, further create TCP connections, and setup/tear down different routing paths, as will be outlined in more detail in the following.

Figure 3:
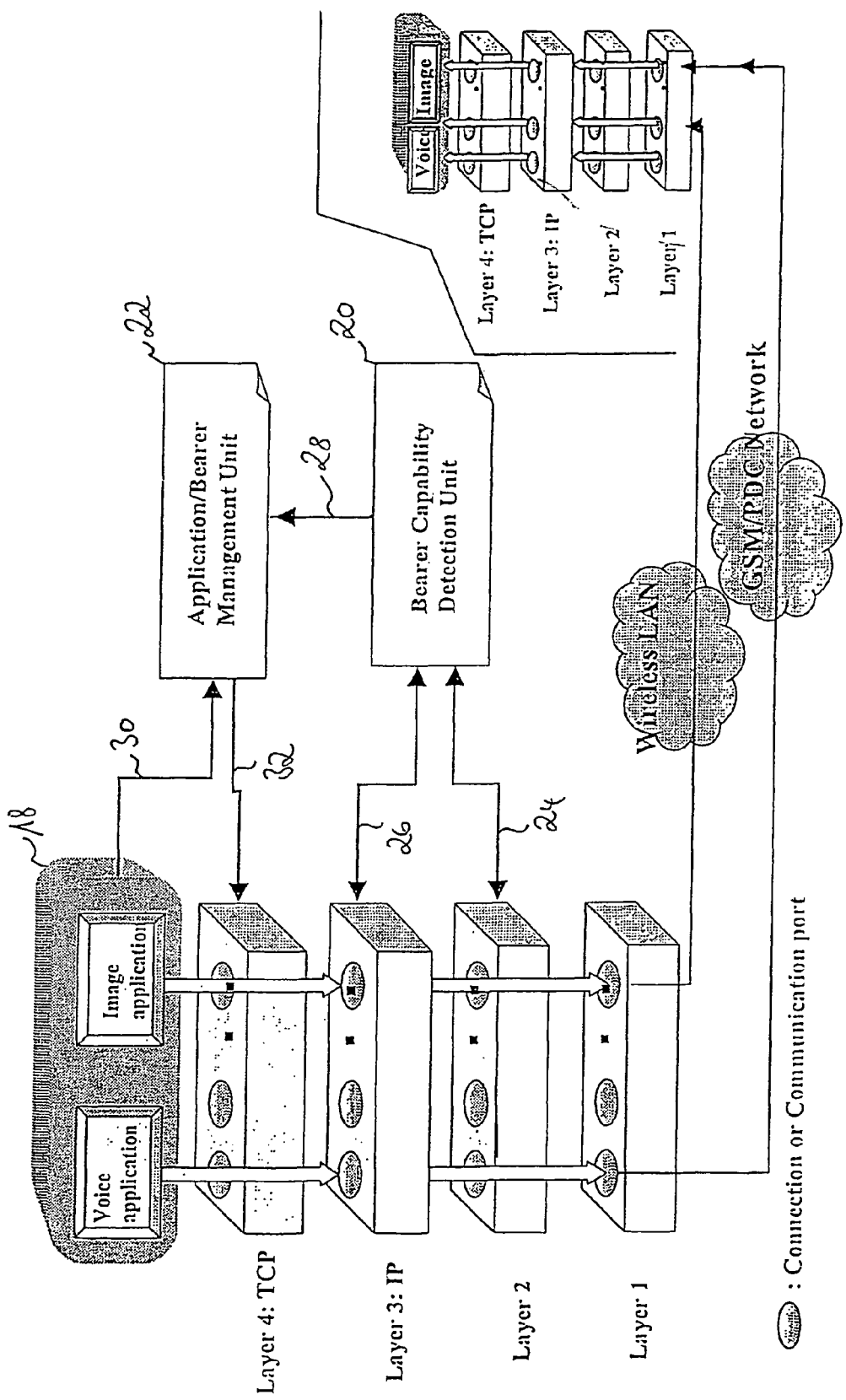
FIG. 3 shows further details of the middleware platform shown in FIG. 2.

FIG. 3 shows further details of the middleware platform shown in FIG. 2.

As shown in FIG. 3, the middleware platform 16 divides into a bearer capability detection unit 20 and an application/bearer management unit 22.

Operatively, the bearer capability detection unit 20 is adapted to detect available bearer services and/or related bearer capabilities. In other words, it is possible to detect the type of bearer services as such, and optionally also related bearer capabilities. Alternatively, related bearer capabilities may be pre-stored in relation to the type of bearer services so that determination of bearer capabilities is not required.

Further operatively, the application/bearer management unit 22 is adapted to manage and provide at least one bearer service for at least one active application running at the mobile endpoint. This management of bearer services for active applications) is also referred to as an assignment of an active application(s) to an available bearer service(s). The assignment is achieved as a function of available bearer capabilities and the overall operational context.

As also shown in FIG. 3, the achievement of the above referenced functionality requires some data exchange between the different sub units explained so far. A first link 24 is established between the layer L2 and the bearer capability detection unit 20 for negotiation of availability of L2 connections in the mobile communication environment. A second link 26 is established to achieve negotiation of layer L3:IP communication capabilities, which is of particularly useful for tunneling on the IP level, i.e. the mapping of an application-initiated IP channel to an IP channel provided by layer L3.

As shown in FIG. 3, a further link 28 is established to forward negotiation results from the bearer capability detection unit to the application/bearer management unit 22 which will use this information to achieve manipulation of layer 2 and layer 3 connections in view of application requirements.

As shown in FIG. 3, there is also established a link 30 between the application layer 18 and the application/bearer management unit 22 for registration of each application running at the mobile endpoint 12 at the application/bearer management unit 22. In view of the information provided through the application layer 18 and the bearer capability detection unit 20, the application/bearer management unit 22 will determine an assignment of the activated applications to the available bearer services, as will be explained in more detail in the following. The application/bearer management unit 22 will then set up/teardown connections on the layer 4:TCP/UCP using a further link 32 provided heretofore.

As shown in FIG. 3, the setup/teardown of connections on layer 4:TCP/UCP will be triggered down to lower layers through connection or communication ports for subsequent forwarding of related application data to an endpoint server providing services for the applications initiated at the mobile endpoint.

Therefore, through the provision of the middleware platform 16 the load on applications for management of connectivity is minimized, so as to increase flexibility and independence of the data transport mechanisms on the application layer while maintaining inter-operability either with newly installed wireless communication networks or with existing wireless communication networks.

Figure 4:
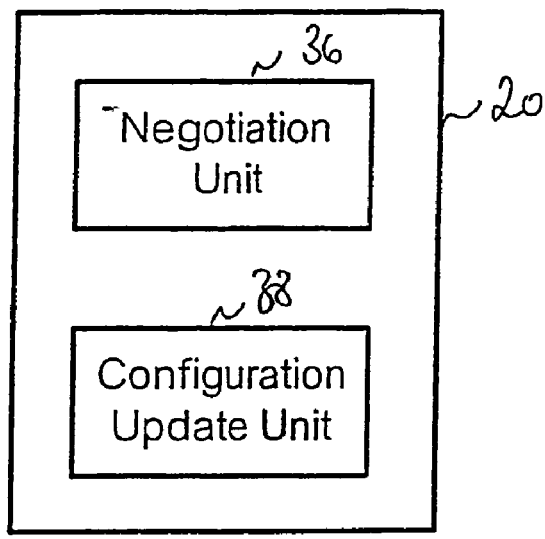
FIG. 4 shows a schematic diagram of the bearer capability detection unit shown in FIG. 3.

FIG. 4 shows a schematic diagram of the bearer capability detection unit 20 shown in FIG. 3.

As shown in FIG. 4, the bearer capability detection unit 20 divides into a negotiation unit 36 and a configuration update unit 38.

Figure 5:
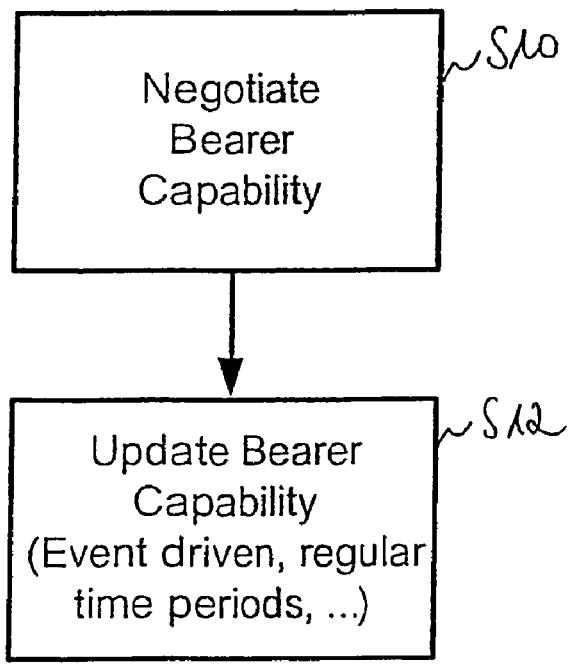
FIG. 5 shows a flowchart of operation for the bearer capability detection unit shown in FIG. 4.

FIG. 5 shows a flowchart of operation for the bearer capability detection unit shown in FIG. 4.

As shown in FIG. 5, in a step S10 the negotiation unit 36 negotiates bearer capabilities with appropriate layers in the protocol stack as shown in FIG. 3, e.g., layer 3:IP and layer L2. Optionally, negotiation of bearer capabilities may be achieved with only a single layer in the protocol stack or any plurality of layers under layer 4:TCP/UCP.

Further, negotiation of bearer capabilities may be achieved through operation on signaling messages forwarded from lower layer levels to upper layer levels and comprising information regarding the type of bearer and available capabilities, i.e. bandwidth, used frequencies, time slots, etc. Another option which is of particular use for newly introduced wireless communication networks would be to provide dedicated signaling messages for the purpose of the present invention to support the middleware platform explained so far.

As shown in FIG. 5, after the step S10 to negotiate bearer capabilities, the configuration update unit 38 shown in FIG. 4 will achieve update of bearer capability information in a related step S12.

Here, it should be noted that such an update may be either achieved at regular time periods in dependence on the result of negotiation at the particular points in time or alternatively event driven when the negotiation of bearer capabilities shows that the operational context with respect to the wireless communication environment changes.

Further, it should be noted that the step S12 to update of bearer capabilities achieves modification of related information either in the bearer capability detection unit 20 or the application/bearer management unit 22. Alternatively, related information may be stored in any other appropriate place within the heterogeneous wireless network without any restriction imposed on the storage location.

Figure 6:
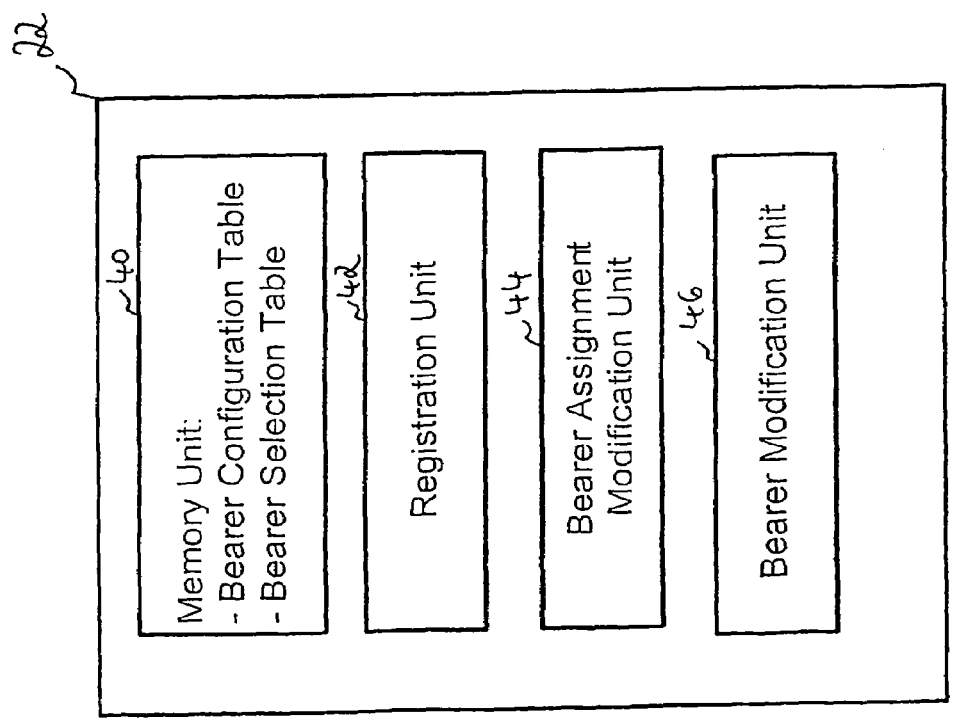
FIG. 6 shows a schematic diagram of the application/bearer management unit shown in FIG. 3.

FIG. 6 shows a further detailed schematic diagram of the application/bearer management unit 22 shown in FIG. 3.

As shown in FIG. 6, the application/bearer management unit 22 divides into a memory unit adapted 40 to store a bearer configuration table and a bearer selection table—to be explained in more detail in the following—, further a registration unit 42 adapted to register active application from the application layer 18, shown in FIG. 3, a bearer assignment modification unit 44 adapted to achieve an assignment of active applications onto available bearers, any bearer modification unit 46 adapted to cooperate with the layer 4:TCP/UCP for setup/teardown of wireless connections in view of the bearer assignment result achieved by the bearer assignment modification unit 44.

Figure 7:
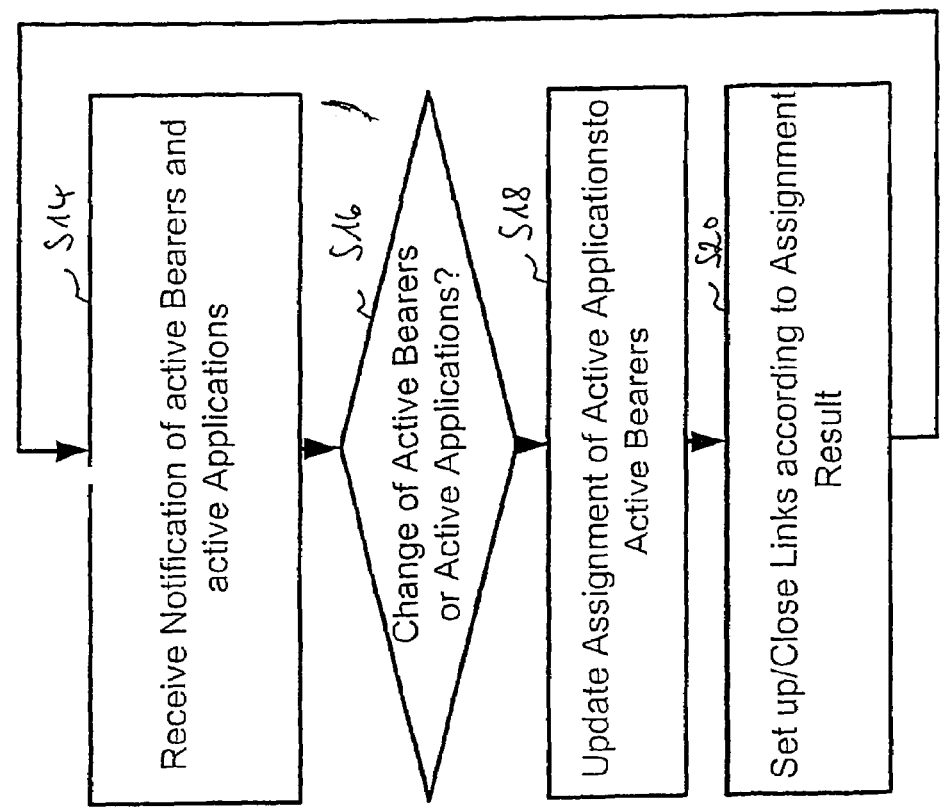
FIG. 7 shows a flowchart of operation for the application/bearer management unit shown in FIG. 6.

FIG. 7 shows a flowchart of operation for the application/bearer management unit 22 shown in FIG. 6.

As shown in FIG. 7, in a step S14, the registration unit 42 will receive notification of active bearers and active applications which information is preferably stored in the memory unit 40, e.g., the bearer configuration table and the bearer selection table. In a subsequent step S16 the bearer assignment modification unit 44 will detect on a change of active bearers and/or active applications. If no change occurs, the procedure will branch back to the step S14 to wait for notification of bearer/application changes. Otherwise, there follows a step S18 executed in the bearer assignment modification unit 44 to update the assignment of active applications to available bearers. Then, in a step S20 the bearer modification unit 46 will set up/close connections in the wireless communication environment according to the assignment result achieved by the bearer assignment modification unit 44. Hereafter, the procedure branches back to the step S14 to await receipt of further notifications of available bearers and/or active applications in the step S14.

In the following, further details of achieving an assignment of active applications to available bearers according to the present invention will be explained with reference to FIGS. 8 to 16.

Figure 8:
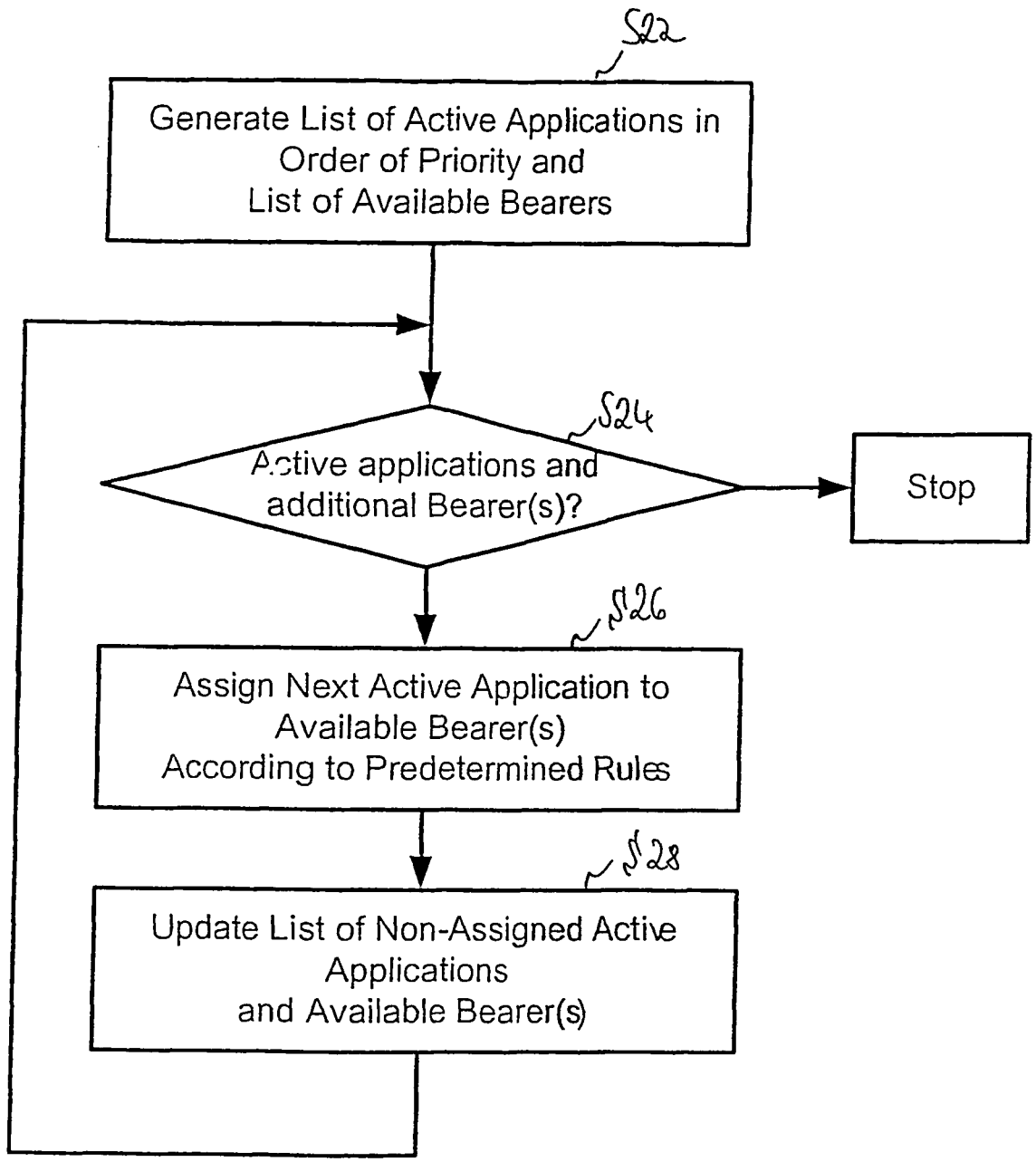
FIG. 8 shows a flowchart of operation for a first procedure adapted to achieve an assignment between active applications and available bearer services according to the present invention.

FIG. 8 shows a flowchart of operation for achieving an assignment of active applications to available bearers which is executed by the bearer assignment modification unit 44 shown in FIG. 6 and corresponds to step S18 shown in FIG. 7.

As shown in FIG. 8, the approach to achieve an assignment of active applications to available bearer services relies on a step-by-step approach, where active applications are assigned to available bearers step-by-step.

As shown in FIG. 8, in a step S22 there is generated a list of active applications, preferably in an order of user priorities, and further a list of available bearer services. In a step S24 it is then determined, whether an additional bearer(s) is(are) available for assignment to active applications. In the negative case, the procedure comes to an end.

Otherwise, in the affirmative case the procedure proceeds to step S26 to assign the next active application to an available bearer service according to predefined rules.

While any type of rules is well applicable within the framework of the procedure shown in FIG. 8, a typical example would be a comparison of the bandwidth required by an active application and the bandwidth provided through an available bearer service. Here, one option would be to minimize the waste of bandwidth during assignment of active applications to available bearer service(s, further to consider latency requirements, real time requirements, cost boundaries and reliability expectations specified by an end user or existing inherently for an active application.

Assuming that either one of such rules is used for assignment of the next active application to the next available bearer in step S26, there follows a step S 28 to update the list of non-assigned active applications and available bearers. Then, the procedure branches back to step S22 to determine whether further active applications and available bearer services need to be handled.

FIGS. 9 and 10 show data structures underlying the application of the procedure explained above with reference to FIG. 8.

A first such data structure is shown in FIG. 9 and relates to a bearer configuration table.

As shown in FIG. 9, the bearer configuration table comprises information regarding different bearer services, e.g., WRAN, GSM-A, GSM-B, GSM-C, GPAS-A, GPARS-B, and the availability of each such bearer service. From the above, it should be clear that the availability may change over time so that also the related entries in the bearer configuration table are updated accordingly at different points in time.

FIG. 10 shows a further data structure also referred to as selection table reflecting user preferences on wireless communication services.

As shown in FIG. 10, different rows are the selection table related different applications, e.g., mail, HTTP, voice, FTP, etc. Optionally, to each application there may be assigned a priority such that the priority value 1 reflects the highest priority and the priority value 4 reflects the lowest priority for the particular example shown in FIG. 10. Further, the end user may define preferences on type of network for each specific application, e.g.; in the order GPRS, WLAN, GSM for the e-mail application, etc.

FIG. 11 shows the result of applying the procedure shown in FIG. 8 to the bearer configuration table 48 shown in FIG. 9 and the selection table shown in FIG. 10.

As shown in the upper part of FIG. 11, the entries being related to availability of the different bearer services may change over time, and therefore differ from a point in time T1 and a point in time T2. Also, according to the present invention there may as well be provided a plurality of bearer services of the same type, e.g., GSM-A, GSM-B, GSM-C, etc.

As shown in the middle part of FIG. 11, at point in time T1 there are available the bearer services WLAN, GSM-B, and GPRS-B. As the voice application has highest priority value 1, initially the bearer service GSM-B will be assigned to this application. The procedure will then handle the next application HTPP with priority value 2 and assign the appropriate bearer service WALN to this application. Proceeding to the mail application with priority value 3, the procedure will determine that neither user preference GPRS-A, WLAN, GSM-B are available any longer for assignment to this application. A first reason is that the bearer services GSM-B and WLAN have been assigned previously to the voice and HTP application, respectively, due to higher values of priority. A second reason is that the bearer service GPRS-A being of highest user preference is not available at all at point in time T1. Therefore, the next step will be the consideration of the application FTP for file transfer with priority value 4. Here, third bearer service available at time T1, i.e. GPRS-B, is in compliance with the third user preference for this application and therefore will be assigned thereto.

As shown in the lower part of FIG. 11, the situation differs at point in time T2 where the bearer services WLAN, GSM-A, GSM-B, and GPRS-A are available. Initially, the bearer services GSM-A will be assigned to the voice application due to high value of priority 1 and also in view of the high user preference for this application. Then, the application HTTP with second priority will be assigned to the bearer service WLAN of highest user preference for this type of application. Subsequent hereto, the mail application with third ranked priority will be mapped to the bearer service GSM-B. It should be noted, that contrary to the point in time T1 this assignment becomes possible at point in time T2 as at this point in time T2 two bearer services according to the GSM standard are available. Finally, the application FTP with priority value 4 will be assigned the bearer service GPRS-A which became available only after the point in time T1.

From the above, it becomes clear that the selection table is well suited for implementing sequential approach to application assignment onto to bearer services. As will be shown in the following with reference to FIGS. 12 to 16, the concept of selection table may only apply to reflect user preference on bearer services, but also to an approach of application assignment to bearer services where, both, bearer service attributes and application attributes are incorporated into the assignment process.

As shown in FIG. 12, the bearer configuration table may not only list different bearer services and related availability/non-availability, but also bearer capabilities, e.g., bandwidth, latency, bit error rate BER, reliability, corresponding costs of utilization, etc. It should be noted that the specific examples for bearer capability attributes listed in bearer configuration table shown in FIG. 12 are to be considered as example only and may be modified in any way.

As shown in FIG. 13, the selection table may not only describe preferred bearer services for different types of applications, but to the contrary content based attributes of applications, which may be forwarded to the selection table, e.g., during registration of the active application. Typical examples for the content based attributes of applications are required bandwidth, latency, real time requirements, etc.

Here, it should be clear that such attributes may be divided into attributes which must be met after bearer assignment, and attributes, which should be met after bearer assignment. In the following, the former will be referred to as hard assignment condition and the latter will be referred to as soft assignment condition. It should also be noted, that the question which attributes of an application may be considered as hard or soft assignment attributes may differ from case to case and therefore is to be answered again in a context sensitive manner. Further, it should also be noted that any type of selection table may either be prepared in advance or by modified in real time during execution of the application.

Figure 14:
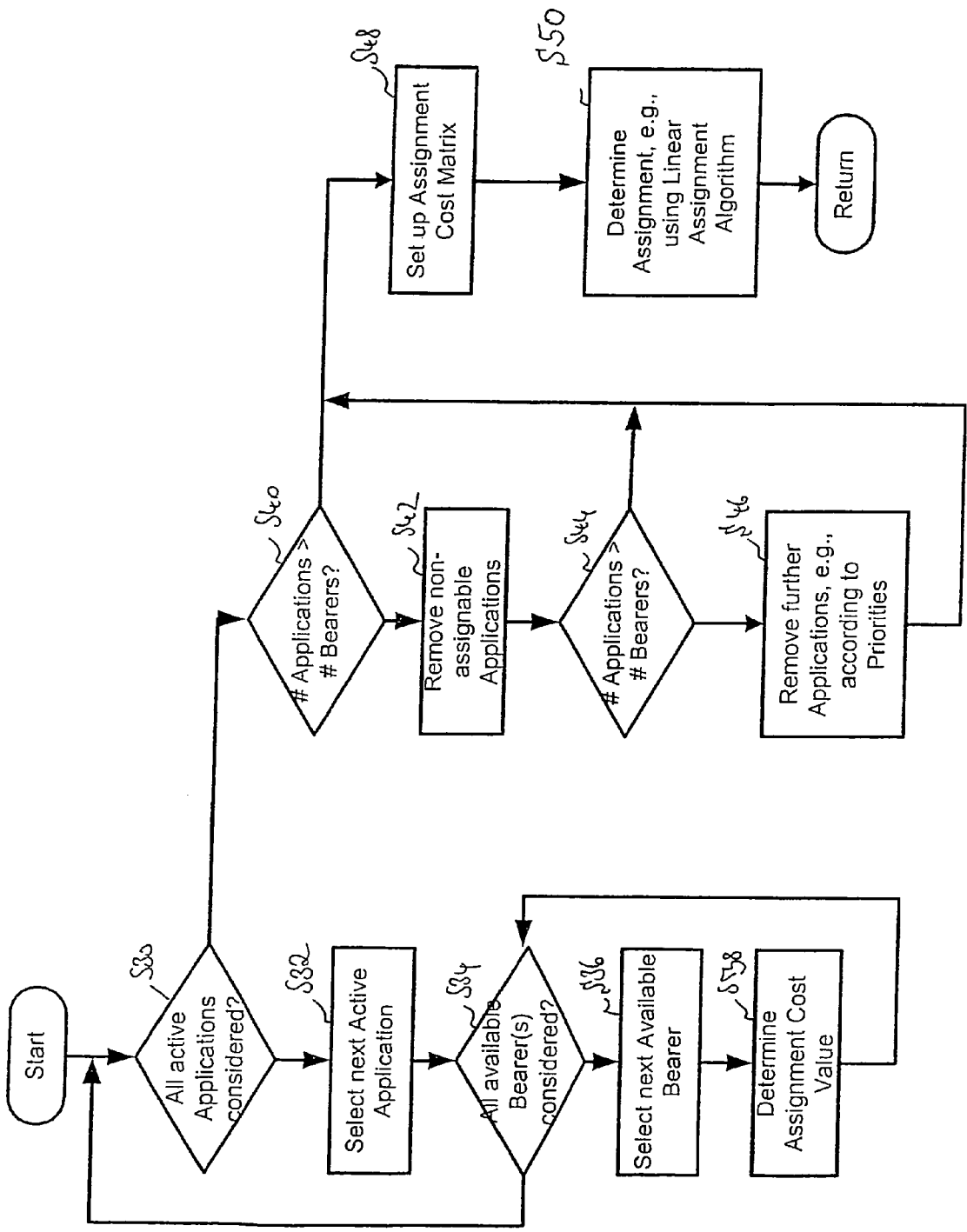
FIG. 14 shows a flowchart of operation for a procedure adapted to derive an assignment of active applications to available bearers using the bearer configuration table shown in FIG. 12 and the application configuration table shown in FIG. 13.

FIG. 14 shows a flow chart of operation for a procedure to derive an assignment of the active application onto the available services on the basis of the bearer configuration table shown in FIG. 12 and the selection table shown in FIG. 13.

As shown in FIG. 14, the assignment procedure divides into three aspects, i.e., different steps being related to an evaluation of a cost function, the comparison of number of active applications with the number of available bearer services and related exclusion of active applications if not enough bearer services are available, and finally, the actual determination of the assignment of the remaining active applications onto the available bearer services.

As shown in FIG. 14, the first aspect—i.e., the isolation of a cost function also referred to in the following FIG. 15—relates to S30 to step S38. Step S30 relates to an interrogation whether all active applications have been considered. If this is not the case, in a step S32 the next active application will be considered for evaluation of a cost function. Heretofore, in a step S34 it is checked whether all available bearer services have been considered for the selected active application. If this is the case, the procedure will branch back to a step S30 for interrogation whether further active applications must be considered. Otherwise, the procedure will proceed to a step S36 to select the next available bearer service for cost function evaluation. This cost function evaluation will be achieved in a step S38 such that a cost function reflecting the costs of assigning the currently selected application to the currently considered available bearer service will be evaluated. It should be clear, that the particular type of cost function is not of particular relevance to the frame work as outlined so far, as long as it allows for an appropriate consideration of hard assignment conditions and soft assignment conditions.

As shown in FIG. 14, the next phase of the assignment procedure according to steps S40 to S46 relates to the comparison of activated applications against available bearer services. In other words, this phase of the assignment procedure is provided to handle a situation where the number of active applications is larger than the number of available bearers, which is checked in a step S40. If the number of active applications is larger than the number of available bearers, there follows a step S42 to determine those active applications which may not be assigned to any available bearer or in other words, those active applications with at least one hard assignment condition may not be fulfilled, e.g., due to restricted band width availability. Subsequent to step S42 there it follows a further interrogation step S44 to determine whether the number of active applications is still larger the number of available bearers. If this is the case there follows a step S46 to further reduce the number of active applications that must be assigned to available bearers. A first option for step S46 would be the consideration of user priorities assigned to different active applications so as to drop out those active applications having low priorities. Another option would be to select applications for drop out at random, according to the type of application, or any other appropriate criteria. The only pre-requisite is, that after execution of step S46 the number of active applications for assignment to available bearer services is indeed not exceeding the number of available bearer services.

As shown in FIG. 14, the last phase of the assignment procedure according to step S48 and S 50 relates to achievement of actual assignment after processing of the steps to evaluate the cost function and to adapt the number of active applications to the number of available bearers.

Heretofore, in a step S48 there is set up a cost matrix reflecting the costs for assignment of each active application to each available bearer service. Then follows a step S50 to determine an optimal assignment. Here, one example for achieving such an optimal assignment would be the application of linear assignment algorithm to the cost matrix generated in step S48. Again, any other suitable approach for deriving an optimal assignment in view of the generated cost matrix is as well covered by the scope of the present invention.

Further to the step by step approach outlined above with reference to FIG. 8 to 11, the modified bearer configuration table shown in FIG. 12 and selection table shown in FIG. 13 as well as the related assignment procedure shown in FIG. 14 allow for a more detailed evaluation of bearer configuration attributes and application configuration attributes on the one hand and also the achievement of a global optimum for the assignment result in view of the availability of a cost matrix which reflects all options for assignment of active application to available bearers.

Figure 15:
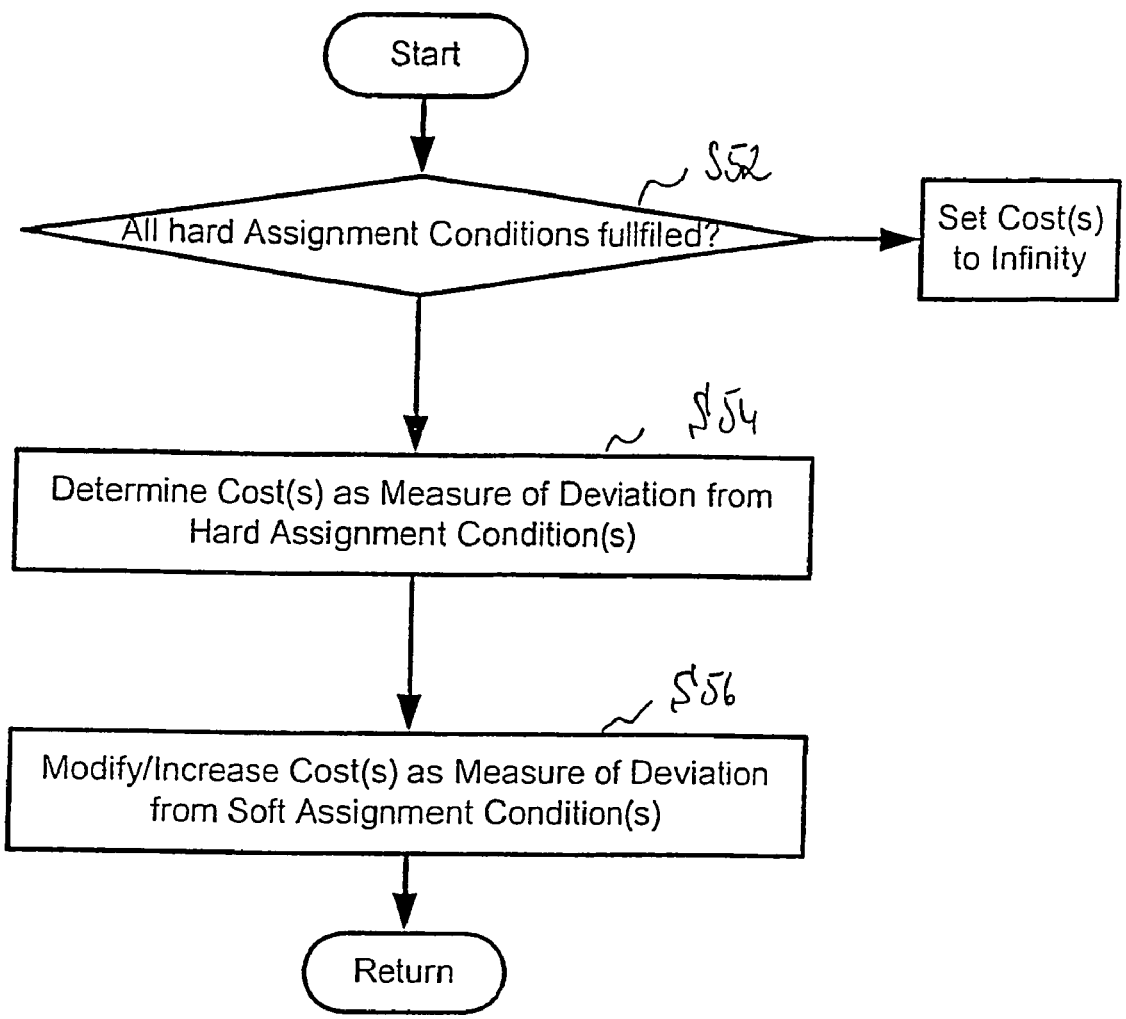
FIG. 15 shows a flow chart of operation to determine the cost for assignment of each active application to each available service.

FIG. 15 shows a flow chart of operation to evaluated cost function according to step S38 shown in FIG. 14.

As shown in FIG. 15, when evaluating the cost of assigning an active application to an available bearer service, initially all hard assignment conditions are checked in a step S52. If only one such hard assignment condition may not be fulfilled the related costs will be set such that no assignment will be achieved later on, i.e. by setting the related costs to infinity in the assignment matrix.

Otherwise, there follows a step S54 to determine the costs as a measure of deviation from the hard assignment condition, e.g., by increasing the related costs when a deviation from hard assignment condition gets higher and higher. One typical example would be that a cost for assigning an active application to a bearer service is set high when bandwidth available from the bearer service is wasted, and to the contrary, by setting the costs low when the bandwidth provided through the bearer service is well suited for the band width requested by an active application. The same concept may also be applied to attributes like latency, real time requirement, costs of communication, etc.

In particulars there may be executed a step S56 to modify/extend the costs determined previously in step S54 as a measure of deviation from soft assignment condition(s) in the same sense for the hard assignment condition(s).

Also, it should be noted that the question what type of attributes constitute hard assignment conditions and what type of attributes are related to soft assignment conditions may be different from case to case and is configurable according to the context of application, mobile endpoint, and wireless network capability, respectively.

FIG. 16 shows an example of a cost matrix derived on the basis of the bearer configuration table shown in FIG. 12 and the selection table shown in FIG. 13 through the assignment procedure shown in FIG. 14.

As shown in FIG. 16, the different columns of the cost matrix are related to different bearer services, i.e., GSM-A, GSM-B, GPRS, WLAN. Further, different rows of the cost matrix are related to different active applications such as voice, HTP, mail, VoIP.

As also shown in FIG. 16, those assignments which have a perfect fit will have a related cost function of zero, such as voice on GSM-B, HTTP on WLAN. Further, the costs of assignment of the mail application onto GPRS or WLNA will be larger than zero due to waste of bandwidth, in particular the cost for assigning the mail application onto the WLAN service will again be larger than the cost for assigning the same service to GPRS, again for increased waste of bandwidth.

Assuming that the VoIP application may be assigned both to GPRS and WLNA, it becomes clear that related costs for assigning the application to GPRS are smaller than those for assignment to WLAN in view of bandwidth considerations. Further, for the same application VoIP related assignment costs to the GSM-A and GSM-B bearer service are set to infinity due to non-match of type of traffic, i.e. packet switched active application versus circuit switched bearer service. The same also applies for assignment of Voice to GPRS, WLAN bearer services. It should also be noted, that while different GSM bearer services are available, the first GSM bearer service GSM-A does not fulfill latency requirements of the voice application, so that the related cost is set to infinity. Finally, the HTTP application may not be assigned to the GSM-A, GSM-B and GPRS bearer service in view of violation of hard bandwidth assignment condition.

In view of the cost matrix as explained above, subsequent to the set up of the cost matrix there may be determined an optimal assignment to minimize overall costs. Here, the object is to determine an assignment of application Ai to bearer Bj such that overall sum of related costs Cij is minimized and each single application Ai is assigned to a different service Bj. For the example shown in FIG. 16 the optimal assignment would be voice/GSM-B, HTTP/WLAN, mail/GSM-A and VoIP/GPRS. It should be noted that such optimal assignment may be derived, e.g., using the linear assignment algorithm running on the cost matrix. The details of such linear assignment algorithm are well known to those skilled in the art of computer science and therefore will not be explained in detail here.

While above the best mode and preferred embodiments of the present invention have been described with respect to the drawing, it should be understood that different features being explained with reference to the drawing may be freely combined to arrive at further modifications and verifications of the present invention. Clearly, the person skilled in the art achieves such modifications and verifications, e.g., combine different aspects of the procedures explained for assigning active applications to available services, assignment of different subunits of the inventive middleware platform to different sites in the heterogeneous wireless network to arrive at a distributed implemented implementation of the middleware platform, modify the determination of costs functions for such related assignments, etc. Therefore, the scope of the present invention shall only be determined by the claims appended to the specification.

The invention claim is:

1. Method of providing at least one bearer service through a heterogeneous wireless network including a plurality of wireless connections in support of at least one application running at a mobile endpoint, comprising the steps:

detecting an operational context including characteristics of the mobile endpoint, characteristics of at least one application running at the mobile endpoint, characteristics of application data to be transferred, and/or availability and capability of at least one bearer service;

dynamically optimizing among bearer service providers and related set up or tear down of wireless connections provided through the heterogeneous wireless network according to the detected operational context.

2. Method according to claim 1, further comprising a step of updating bearer services and/or related bearer capabilities in a bearer configuration memory.

3. Method according to claim 2, wherein the step of updating bearer services and/or related bearer capabilities in a bearer configuration memory is executed event driven or at pre-determination points in time.

4. Method according to claim 1, further comprising a step of registering active applications running at the mobile endpoint.

5. Method according to claim 4, wherein the step of registering active applications further registers application requirements.

6. Method according to claim 5, wherein application requirements are selected from a group comprising application configuration requirement and application priority.

7. Method according to claim 4, wherein application related information is stored in a selection table.

8. Method according to claim 4, wherein the step of dynamically optimizing among bearer service providers further comprises the steps of:
negotiating at least one communication request existing for the active application against a bearer capability of the heterogeneous wireless network; and
updating at least one assignment of an active application to an available bearer service in the heterogeneous wireless network in accordance with a negotiation result.

9. Method according to claim 8, wherein the step of negotiating comprises a step of generating a list of active applications in order of priority and generating a list of available bearer services and/or related bearer capabilities in the heterogeneous wireless network.

10. Method according to claim 9, wherein the step of negotiating further comprises the steps of:
assigning the next active application according to the order of priority to an available bearer service according to at least one predetermined rule; and
updating the list of available bearer services and the list of non-assigned active applications.

11. Method according to claim 8, wherein the negotiating and updating steps are repeated while an application is active.

12. Computer program product directly loadable into the internal memory of a mobile communication middleware platform comprising software code portions for performing the steps of claim 1, when the product is run on a processor of the mobile communication middleware platform.

13. Apparatus for establishing a middleware platform on top of a heterogeneous wireless network including a plurality of wireless connections in support of at least one application running at a mobile endpoint,
comprising:
a middleware platform unit adapted to detect an operational context including characteristics of the mobile endpoint, characteristics of the at least one application running at the mobile endpoint, characteristics of application data to be transferred, and/or availability and capability of the at least one bearer service;
a bearer management unit adapted to dynamically optimize among bearer service providers and related set up or tear down of related wireless connections provided through the heterogeneous wireless network according to the detected operational context.

14. Apparatus according to claim 13, further comprising a bearer capability update unit adapted to update bearer services and related capabilities in a bearer configuration table.

15. Apparatus according to claim 13, wherein the bearer capability update unit is adapted to update bearer capabilities in a bearer configuration table in an event driven manner or at pre-determined points in time.

16. Apparatus according to claim 13, wherein the bearer management unit comprises a registration unit adapted to register active applications running at the mobile endpoint.

17. Apparatus according to claim 16, wherein the registration unit is adapted to register application requirements.

18. Apparatus according to claim 17, wherein the registration unit is adapted to register application requirements selected from a group comprising application configuration requirement and application priority.

19. Apparatus according to claim 13, wherein the bearer management unit comprises a memory unit adapted to store application related information according to a selection table data structure.

20. Apparatus according to claim 19, wherein the bearer management unit further comprises a bearer assignment modification unit adapted to:
negotiate at least one communication request existing for the active application against a bearer service and related bearer capability of the heterogeneous wireless network; and
update at least one assignment of an active application to an available bearer service in the heterogeneous wireless network in accordance with a negotiation result.

21. Apparatus according to claim 20, wherein the bearer assignment modification unit is adapted to generate a list of active applications in order of priority and a list of available bearer services in the heterogeneous wireless network.

22. Apparatus according to claim 21, wherein the bearer assignment modification unit is further adapted to:
assign the next active application according to the order of priority to an available bearer service according to at least one pre-determined rule; and
to update the list of available bearer services and/or related bearer capabilities and the list of non-assigned active applications.

23. Apparatus according to claim 20, wherein that the bearer assignment modification unit is adapted to repeat negotiation of bearer capabilities and update of available bearer services and/or related bearer services while an application is still active.

* * * * *